United States Patent
Breitfeld et al.

(10) Patent No.: US 11,981,390 B2
(45) Date of Patent: May 14, 2024

(54) STOP FOR HANDLEBARS OF TWO- AND THREE-WHEELED VEHICLES AND METHOD FOR MANUFACTURING SUCH A STOP

(71) Applicant: HWG Horst Weidner GmbH, Renningen (DE)

(72) Inventors: Sven Breitfeld, Magstadt (DE); Johannes Lutter, Gerlingen (DE)

(73) Assignee: HWG Horst Weidner GmbH, Renningen (DE)

( * ) Notice: Subject to any disclaimer, the term of this patent is extended or adjusted under 35 U.S.C. 154(b) by 617 days.

(21) Appl. No.: 17/277,750

(22) PCT Filed: Sep. 20, 2019

(86) PCT No.: PCT/DE2019/100828
§ 371 (c)(1),
(2) Date: Mar. 19, 2021

(87) PCT Pub. No.: WO2020/057698
PCT Pub. Date: Mar. 26, 2020

(65) Prior Publication Data
US 2021/0354775 A1    Nov. 18, 2021

(30) Foreign Application Priority Data
Sep. 21, 2018    (DE) ..................... 10 2018 123 210.8

(51) Int. Cl.
*B62K 21/06*     (2006.01)
*B62K 21/08*     (2006.01)
(Continued)

(52) U.S. Cl.
CPC .............. *B62K 21/06* (2013.01); *B62K 21/08* (2013.01); *F16C 19/16* (2013.01); *F16C 35/06* (2013.01); *F16C 2326/20* (2013.01)

(58) Field of Classification Search
CPC ......... B62K 21/06; B62K 21/08; F16C 19/16; F16C 35/06; F16C 2326/20
See application file for complete search history.

(56) References Cited

U.S. PATENT DOCUMENTS

| | | | |
|---|---|---|---|
| 6,343,806 B1 * | 2/2002 | Lee | B62K 19/32 280/272 |
| 8,439,385 B2 * | 5/2013 | Baron | B62K 9/02 280/288.4 |

(Continued)

FOREIGN PATENT DOCUMENTS

| CN | 2463298 | 12/2001 |
|---|---|---|
| CN | 2606049 | 3/2004 |

(Continued)

*Primary Examiner* — Kevin Hurley
*Assistant Examiner* — Marlon A Arce
(74) *Attorney, Agent, or Firm* — Smartpat PLC

(57) ABSTRACT

A stop for handlebars of two-wheeled vehicles is integrated into the control head bearing of the vehicle. It is formed by a first component installed in the control head bearing with a circular arc-shaped groove that is arranged coaxially to the rotational axis of the control head bearing and a stop element protruding into this groove. The stop element is arranged on a second component that can be moved relative to the first part. The stop at the lower control head bearing is arranged within the head tube. The circular arc-shaped groove is arranged in the base and open towards the lower bearing shell. The lower bearing shell comprises an open recess extending over its height to the lower rolling bearing, which receives a stop element. The stop element has a radial lug protruding into the circular groove of the base.

7 Claims, 4 Drawing Sheets

(51) Int. Cl.
  *F16C 19/16*   (2006.01)
  *F16C 35/06*   (2006.01)

(56) References Cited

U.S. PATENT DOCUMENTS

| | | | |
|---|---|---|---|
| 9,475,539 B2 * | 10/2016 | Ehrhard | ............. B62K 21/00 |
| 2007/0009424 A1 | 1/2007 | Ohzuku et al. | |
| 2011/0148070 A1 | 6/2011 | Lanz | |
| 2012/0063712 A1 | 3/2012 | Hsieh | |

FOREIGN PATENT DOCUMENTS

| | | | |
|---|---|---|---|
| CN | 2608404 | | 3/2004 |
| CN | 2608405 | | 3/2004 |
| CN | 106005202 | A | 10/2016 |
| CN | 205952215 | U | 2/2017 |
| DE | 202008004845 | U1 | 6/2008 |
| DE | 202008004733 | U1 | 10/2008 |
| EP | 2848508 | A1 | 3/2015 |
| GB | 2368826 | A | 5/2002 |
| TW | M397345 | U | 2/2011 |
| TW | M399829 | U | 3/2011 |
| TW | 201300276 | A | 1/2013 |

\* cited by examiner

STOP FOR HANDLEBARS OF TWO- AND THREE-WHEELED VEHICLES AND METHOD FOR MANUFACTURING SUCH A STOP

TECHNICAL FIELD

The disclosure relates to a stop for handlebars of two- and three-wheeled vehicles, which is integrated into the control head bearing of the vehicle, and to a method for manufacturing such a stop.

BACKGROUND

Stops for handlebars of two- and three-wheeled vehicles are used to prevent damage to the frame of the vehicle and prevent damage to the control elements arranged on the handlebar, such as, for example, shift, brake and clutch levers, in the event of unintentionally turning the front wheel and the handlebar connected to it in a torque-proof manner too sharply. Thereby, such stops only become effective in a non-safety-relevant area so that the functional steering of the vehicle is not impaired.

A steering stop for a cycle is known for this, in which the function of the control head bearing, and the function of the handlebar stop are arranged lying within the upper control head bearing. In a known way, the control head bearing consists of a bearing shell, which coaxially receives a rolling bearing, a headset cover covering the rolling bearing along with a bearing shell with a seal and a clamp, which is connected to the shaft tube of the front wheel fork in a non-positive-locking manner. The bearing shell of the control head bearing comprises an internal semi-circular groove, into which a spring arranged on the lower end face of the cover of the control head bearing facing the rolling bearing engages in a positive-locking manner in the mounted state. At both ends of the groove, there is a rubber-like cylinder, which attenuates the stop of the handlebar. At its upper free end face, the cover of the control head bearing is provided with a recess, into which the clamp engages in a positive-locking manner in the mounted state so that the headset cover participates in the pivoting movement of the handlebars, wherein the spring moves within the semi-circular groove. Its movement and thus the swivel movement of the handlebar are limited by the opening angle of the groove (DE 20 2008 004 U1).

A device is also known for limiting the steering angle of a steering device between a first and a second end position for a bicycle, which comprises a wheel guide device and a vehicle frame device. The edge guide device is rotatably mounted around a steering axle in a head tube of the vehicle frame device. A steering stop device with a first and a second steering stop surface is arranged. on the wheel guide device. A stop counterpart device with a first and a second stop mating surface is arranged on the vehicle frame device. The first steering stop surface contacts the first stop mating surface. In this first end position, and the second steering stop surface contacts the second stop mating surface in the second end position. The first and second steering stop surfaces are radially and axially located at least partially within this head tube (EP 2 848 508 A1).

Due to the ever-increasing functional integration of switching and supply lines into the region of the upper control head bearing, here, increasingly less installation space remains for a steering head stop. In addition, the steering stop described above requires a bearing shell that is firmly connected to the head tube of the frame, which receives the rolling bearing. This design is present in the case of about 80% of all vehicles. In the remaining 20% of vehicles, the rolling bearing is pressed directly into the head tube of the frame. In these vehicles, the steering stops described above cannot be used.

SUMMARY

An object of the disclosure is therefore to develop a stop for handlebars of two- and three-wheeled vehicles, which is applicable to all handlebars regardless of the method of installing the rolling bearings and does not affect the functional integration of switching and supply lines into the region of the upper control head bearing. A further object is to develop a simplified method for manufacturing a stop for handlebars of two- and three-wheeled vehicles.

The novel stop for handlebars of two- and three-wheeled vehicles has the essential advantage that it is fully integrated into the head tube of the frame of the vehicle. It is located, including the means that transmit the legally prescribed torque of 60 Nm from the handlebar stem onto the vehicle fork, within the bearing shell connected to the head tube, thereby being completely within the frame of the vehicle.

This is achieved by arranging the handlebar stop on the lower control head bearing within the head tube. For this purpose, the lower control head bearing consists of a base that is connected to the fork of the vehicle in a torque-proof manner, a rolling bearing and a bearing shell connected to the head tube of the frame of the vehicle in a torque-proof manner, into which the base and the rolling bearing can be inserted. In the base, a circular groove is arranged, which is open towards its outer circumference. Its minimum opening angle is based on the legal requirements for impact angles of handlebars for two-wheeled vehicles. For common cycles and trekking cycles, this angle to the right and left is 60°, i.e., a total of 120°. For road cycles and youth cycles, the angle is ±30°, i.e., a total of 60°.

The bearing shell comprises a recess extending across its height, which receives the stop element. The stop element comprises two different radial thicknesses across its height, wherein the thickness in the region of the lower rolling bearing is not greater than the radial depth of the open recess of the lower bearing shell. The thickness in the region of the base is chosen to be large enough so that the stop element protrudes into the circular arc-shaped groove of the base.

In general, however, it is also possible to interchange the functional elements of the stop with one another, i.e., inserting the stop element into the base of the lower control head bearing. In this case, however, the circular arc-shaped groove is then to be placed in the bearing shell. The base itself can also be an integral part of the vehicle's fork. In this case, the circular arc-shaped groove must be inserted there, or the stop element must be fixed there, or a separate part must be additionally inserted into the lower control head bearing, which performs the function of the respective functional element of the stop.

It is also possible that the bearing shell is an integral part of the head tube of the frame of the vehicle. In this case, that which has been previously stated with regard to a base firmly connected to the fork of the vehicle concerning the arrangement of the functional elements of the stop shall adequately apply.

According to a favorable embodiment, the surface of the stop element facing the rotational axis of the control head bearing in the region of the coaxially fitted lower rolling bearing is concave, thereby being formed in such a way that it corresponds to the inner circumferential surface of the bearing shell, virtually meaning the continuance of the inner circumferential surface of the bearing shell. In this case, it does not protrude beyond the inner circumferential surface of the bearing shell in order to avoid excessive radial pressure on the rolling bearing at this point. This has the advantage that the stop element can move easily within the recess of the bearing shell in the circumferential direction.

According to a particularly favorable embodiment, for the torque-proof connection of the base with the shaft tube of the fork in the base, at least one longitudinal groove is arranged for receiving a pin. The pen slightly protrudes with a part of its sheath beyond the inner wall of the base into the interior space enclosed by the base so that the base impinged on the fork is connected to the fork in a torque-proof manner. This achieves a secure positive and non-positive-locking connection between the fork and the base. Favorably, three longitudinal grooves are provided, which are distributed at the same angular distance to one other across the inner circumference of the base.

In an additional advantageous embodiment, the recess in the bearing shell is slightly wider in the circumferential direction than the stop element. The upper region of the stop element comprises a recess on both sides, which each receives, in the mounted state, an elastic part, which fills in the space formed by the recesses between the stop element and bearing shell at least in the circumferential direction. Thereby, the two elastic parts absorb the impact of the base on the stop element in an attenuating manner when the handlebars are fully swung out so that no metallic impact noise is generated, and the service life of the handlebar stop is increased.

According to another favorable embodiment, the upper end face of the stop element is provided with a retaining lug that is radially directed inwardly, which rests on the upper edge of the outer ring of the lower rolling bearing in the mounted state. This prevents the stop element from falling out of the lower control head bearing.

The method for manufacturing the stop for handlebars of two- and three-wheeled vehicles has the advantage that the stop element is manufactured as a separate part and can be joined with the rolling bearing in a single step. Manufacturing the stop is carried out as follows:

A circular arc-shaped groove, which is open towards the outer circumference, is inserted into the base of the lower control head bearing. A recess extending across the height of the bearing shell is inserted into the bearing shell. The separately manufactured stop element is moved radially into the position above the recess of the bearing shell and pressed together with the rolling bearing into the bearing shell, wherein its inner surface facing the rotational axis of the control head bearing adjoins the inner sheath of the bearing shell in a flush manner or stands slightly behind it.

Further advantages and favorable embodiments can be found in the following description, the claims and the drawings.

BRIEF DESCRIPTION OF THE DRAWINGS

A preferred exemplary embodiment of the object according to the invention is shown in the drawing and will be explained in detail in the following.

DETAILED DESCRIPTION

Figure 1:
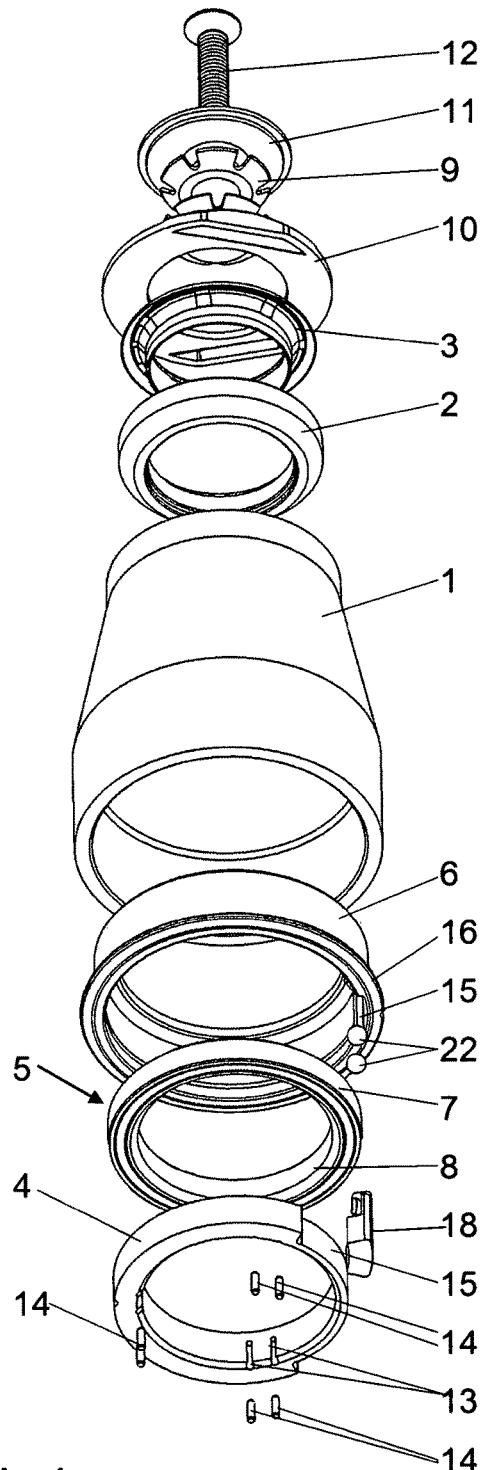
FIG. 1 shows a control head bearing with the stop in an isometric exploded view.
Figure 2:
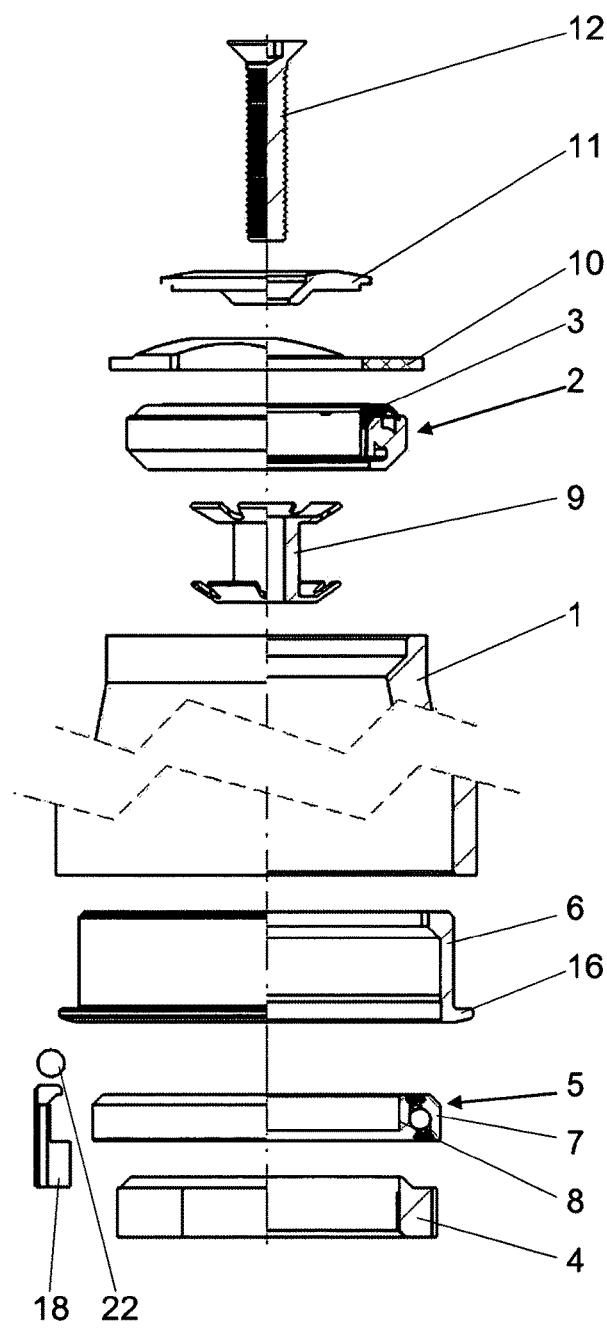
FIG. 2 shows the control head bearing from FIG. 1 in exploded sectional view.
Figure 3:
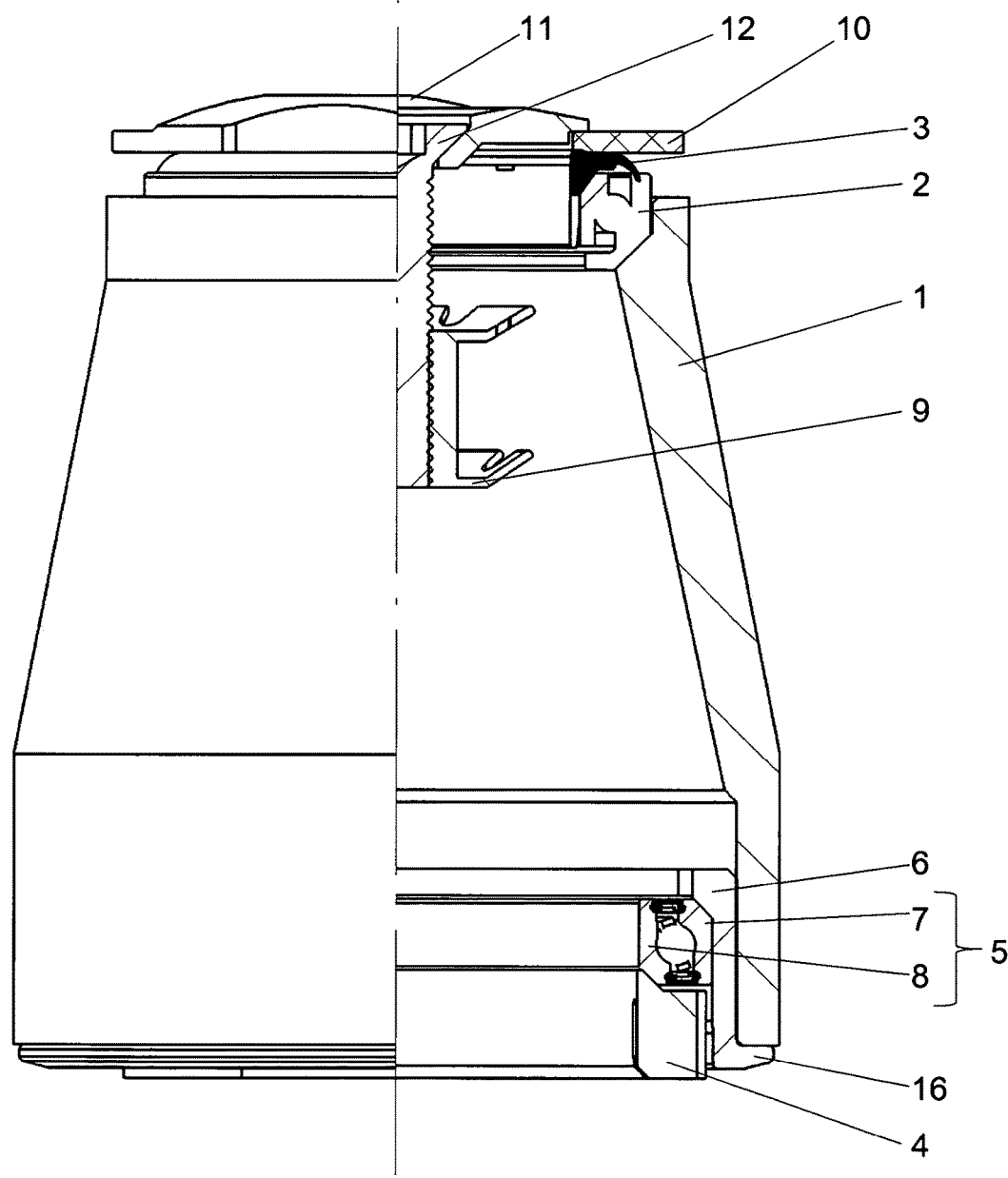
FIG. 3 shows the control head bearing from FIG. 1 in the assembled state in sectional view.

FIGS. 1 and 2 show a control head bearing with the stop in an exploded view, and FIG. 3 shows it with this in the installed state. The control head bearing is installed in a head tube 1 of a frame of a vehicle (not shown here) and consists, in a known manner, of an upper control head bearing arranged below the handlebar stem of the handlebar of the vehicle in the head tube 1, and a lower control head bearing arranged above the fork (also not shown here) with steer tube of the vehicle arranged lower control head bearing. The upper control head bearing comprises an upper rolling bearing 2, which is mounted by a clamping ring 3 in the head tube 1 (FIG. 3). The lower control head bearing consists of a base 4, which is impinged on the steer tube (not shown here), a lower rolling bearing 5 on the base 4, and a lower bearing shell 6, into which the rolling bearing 5 with its outer ring 7 is pressed. The lower bearing shell 6 is pressed into the lower opening of the head tube 1 (FIG. 3). The steer tube is passed through the inner ring 8 of the rolling bearing 5 and the inner ring of the upper rolling bearing 2 and protrudes into the upper clamping ring 3. A clamping claw 9 is driven into the upper opening of the steer tube, which transmits the steering torque applied by the handlebar of the vehicle by the driver to the fork via the handlebar stem (also not shown here). In accordance with legal regulations, the minimum torque is 60 Nm.

For the sake of completeness, FIGS. 1 to 3 still show the parts that connect the handlebar stem to the fork and the head tube 1: the head tube 1 is covered by a spacer 10. The handlebar stem is fixed to the steer tube by a clamping cover 11 and an adjustment screw 12 and rotatably connected to the head tube 1 without any play.

The control head bearing that is crucial to the stop for the handlebar of the vehicle is the lower one. As can be seen from FIGS. 1 and 4, on its inner sheath in the present example, the base 4 comprises a total of six axially running longitudinal grooves 13, which are inserted in pairs, viewed in the installation position, from below into the base 4 as blind holes in the present example. The wall of the hole holes is open to the rotational axis of the fork so that pins 14 inserted into these blind holes slightly protrude over the inner wall of the base 4, in the present example, protruding about 0.15 mm (FIGS. 1, 4, 6 and 7). When striking the base 4 onto the steer tube, the pins 14 create a furrow on its outer sheath, whereby in addition to the non-positive fit, another positive-locking fit ensures the twist protection between the base 4 and fork. Due to the described design of the twist protection, a torque of 120 Nm is achieved during the transmission of the steering movement to the fork.

Figure 4:
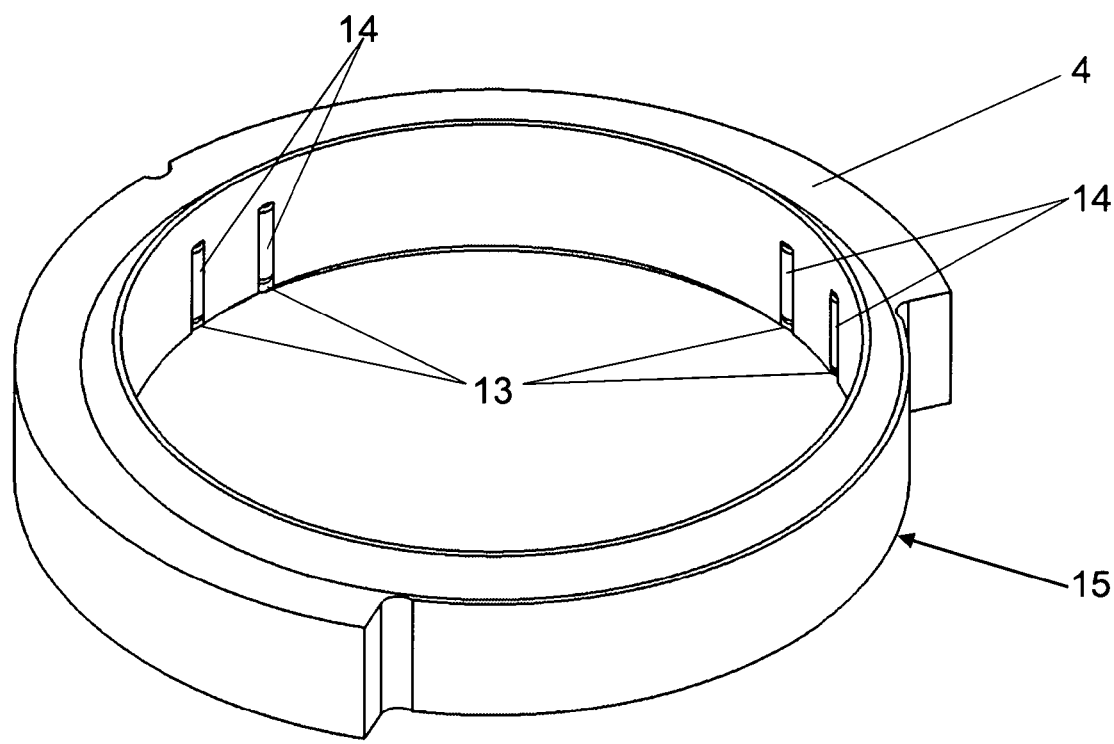
FIG. 4 shows the base of the assembly of the stop.

As can be seen in particular from FIG. 4, the outer circumference of the base 4 is provided over a third with an open recess 15 to the outer circumference. The angle that the flanks of the recess 15 form is 120°. In this respect, FIG. 7 indicates that no longitudinal grooves 13 and pins 14 are arranged in this region with a weakened thickness.

Figure 5:
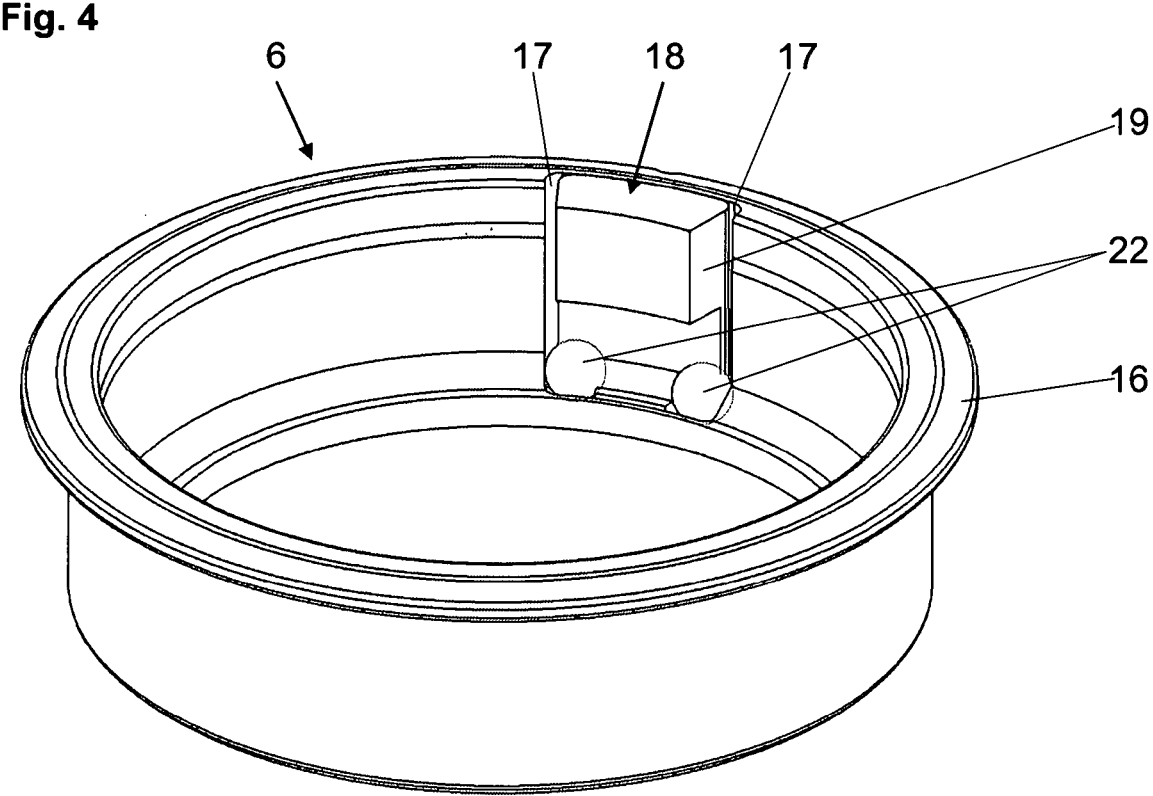
FIG. 5 shows the bearing shell of the assembly of the stop with a stop element.
Figure 6:
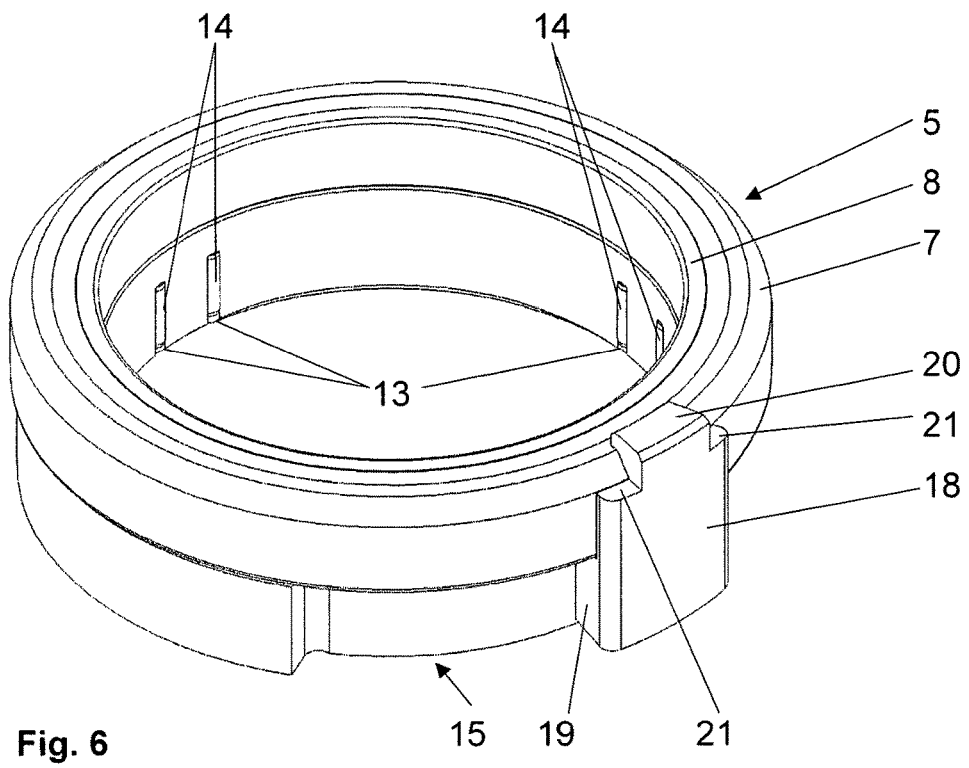
FIG. 6 shows the assembly of the stop without the bearing shell in an isometric view.
Figure 7:
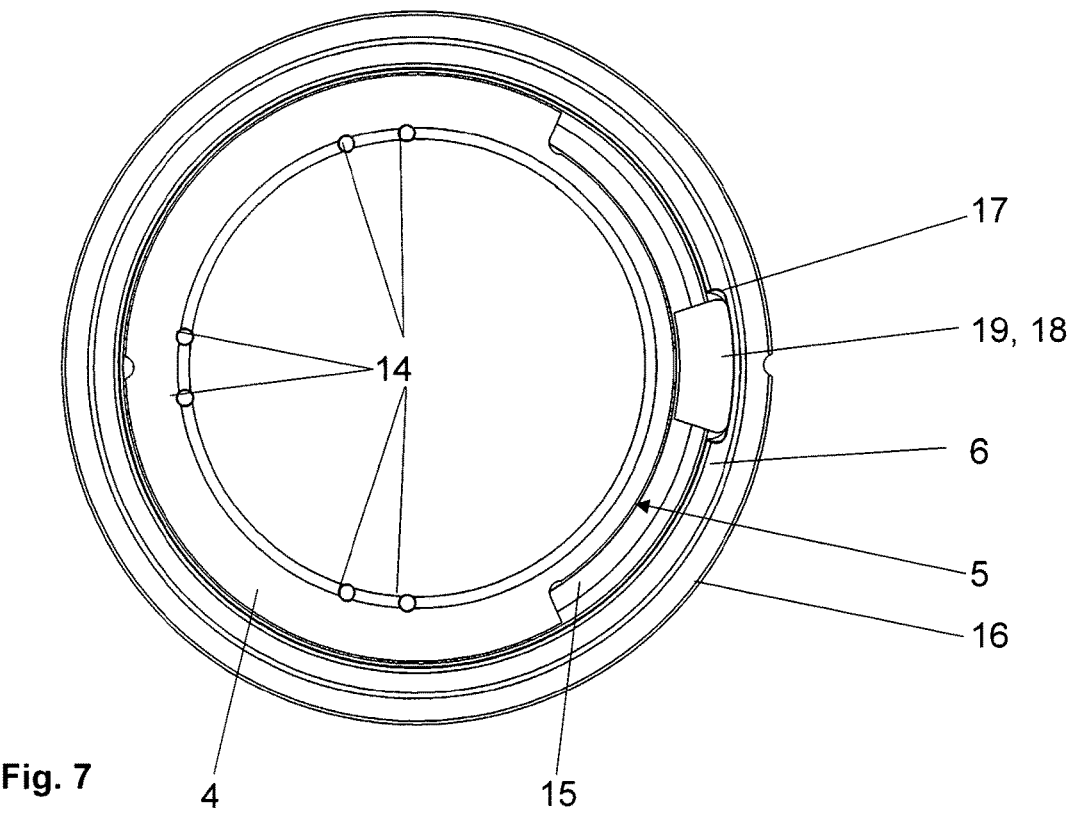
FIG. 7 shows the entire assembly of the stop in a view from below.

FIG. 5 shows the lower bearing shell 6 in the reverse installation position. The height of the lower bearing shell 6 corresponds to at least the sum of the height of the base 4 and the lower rolling bearing 5. With its upper edge 16, it lies on the lower end face of the head tube 1 (FIG. 3) in the mounted state. In the inner sheath of the lower bearing shell 6, a recess 17 running parallel to the rotational axis of the control head bearing that is open towards the lower rolling bearing 5 is introduced for receiving a stop element 18. As can also be seen from FIG. 6, the stop element 18 consists of a square-shaped body, the effective height of which corresponds to the height of the lower bearing shell 6 and its width corresponds to the width of the open recess 17. Its thickness erratically changes on the plane, in which the base 4 and the lower rolling bearing 5 come into contact with each other in the mounted state, meaning lying on one another, wherein its thickness in the region radially adjoining the lower rolling bearing 5 is large enough that its inner sheath does not protrude over the inner sheath of the lower bearing shell 6. An advantage is to form the inner sheath of the stop element 18 to be concave, as shown in FIG. 5, so that it runs, so to say, in continuation of the inner sheath of the lower bearing shell 6 and simultaneously, as can be seen from FIG. 6, lies on the outer sheath of the lower rolling bearing 5. In its region opposite to the base 4, the stop element 18 comprises a section 19 radially protruding inwardly, which protrudes into the recess 15 of the base 4 in the mounted state. For the assembly of the stop in the lower control head bearing, that means that, when joining the stop element 18 to the lower rolling bearing 5 into the lower bearing shell 6, the stop element 18 must always be positioned within the angular range of the recess 15. To prevent the stop element 18 from falling out of the open recess 17, its upper end face is provided with a retaining lug 20, which rests on the upper edge of the lower bearing shell 6 in the mounted state.

A favorable embodiment of the stop can be recognized in FIGS. 4 and 5. In order to achieve an attenuated impact of the stop element 18 at the flanks of the recess 15, the stop element 18 is omitted at its upper end face in the region of its outer edges. The two resulting clearances 21 are limited in the assembled state by the flanks of the open recess 17 of the lower bearing shell 6 and are each filled with an elastic element 22. If a flank of the recess 15 of the base 4 strikes a stop element (18) when a turning the handlebar of the vehicle, this avoids the hard stop while simultaneously compressing the elastic element 22. As a result, the stop is attenuated, thereby reducing the volume of the otherwise audible clashing of two metallic parts. In addition, the wear of the metallic parts caused by this contacting is reduced.

REFERENCE NUMBER LIST 1 head tube
2 upper rolling bearing
3 clamping ring
4 base
5 lower rolling bearing
6 lower bearing shell
7 outer ring
8 inner ring
9 clamping claw
10 spacer
11 clamping cover
12 adjustment screw
13 longitudinal groove
14 pin
15 recess
16 edge
17 open recess
18 stop element
19 section
20 retaining lug
21 clearance
22 elastic element

The invention claimed is:

1. A control head bearing with a stop for a handlebar of a two- or three-wheeled vehicle that includes a frame with a head tube (1) and a fork mounted within it, a shaft tube of which receives a handlebar stem of the handlebar of the vehicle in a torque-proof manner,
wherein an upper and a lower control head bearing each with a rolling bearing (2, 5) are arranged in the head tube (1) and the stop is integrated in the head tube (1),
wherein the stop is formed by
a component, which is firmly connected to the fork as well as a circular arc-shaped groove arranged coaxially to a rotational axis of the control head bearing, and
a stop element (18) protruding into this groove, which is arranged on a component, which is firmly connected to the head tube (1), of the same control head bearing, and is located in the center of the circular arc-shaped groove of the component firmly connected to the fork when the handlebar stem set in a straight position,
wherein the stop on the lower control head bearing is arranged within the head tube (1), which consists of a base (4) connected in a torque-proof manner to the fork of the vehicle, the lower rolling bearing (5), and a lower bearing shell (6) connected in a torque-proof manner to the head tube (1) of the frame of the vehicle,
wherein the lower bearing shell (6) coaxially receives the base (4) and the lower rolling bearing (5) arranged in an installation position above the base (4),
wherein the circular groove is arranged in the base (4) of the lower control head bearing and is designed as a circular arc-shaped recess (15) that is open towards an inner sheath of a lower bearing shell (6),
wherein the lower bearing shell (6) comprises a recess (17) that is open towards the lower rolling bearing (5) extending across its height, which receives the stop element (18), and
wherein the stop element (18) comprises at least two different radial thicknesses across its height, wherein the thickness in a region of the lower rolling bearing (5) is not greater than a radial depth of the open recess (17) of the lower bearing shell (6) and the thickness in a region of the base (4) is dimensioned in such a way that the stop element (18) protrudes into the circular arc-shaped groove of the base (4).

2. The control head bearing according to claim 1, wherein a surface of the stop element (18) facing the rotational axis of the control head bearing in the region of the lower rolling bearing (5) is concave, thereby being formed in such a way that it corresponds to an inner circumferential surface of the lower bearing shell (6), thereby also corresponding to an outer circumferential surface of the bearing shell (5).

3. The control head bearing according to claim 1, wherein for the torque-proof connection of the base (4) to the shaft tube of the fork in the base (4) at least one longitudinal groove (13) is arranged for receiving a pin (14), wherein the pin (14) slightly protrudes with a part of its sheath beyond an inner wall of the base (4) into an interior space enclosed by the base (4).

4. The control head bearing according to claim 1,
wherein the open recess (17) in the lower bearing shell (6) is slightly wider in a circumferential direction than the stop element (18) and an upper region of the stop element (18) comprises a clearance (21) on both sides, which each receives an elastic part (22) in a mounted state, which fills in a space formed by the recess (17) between the stop element (18) and the lower bearing shell (6) at least in the circumferential direction.

5. The control head bearing according to claim 4,
wherein an upper end face of the stop element (18) is provided with a retaining lug (20) that is radially directed inwardly, which rests on an upper edge of an outer ring (8) of the lower rolling bearing (5) in the mounted state.

6. A method for manufacturing a control head bearing with a stop for a handlebar of two- or three-wheeled vehicle comprising a frame with a head tube (1) and a fork mounted within it, a shaft tube of which receives a handlebar stem of the handlebar of the vehicle in a torque-proof manner,
wherein an upper and a lower control head bearing each with a rolling bearing (2, 5) is arranged in the head tube (1) and the stop is integrated in the head tube (1),
wherein the stop is formed by
a component, which is firmly connected to the fork and a circular arc-shaped groove incorporated coaxially to a rotational axis of the control head bearing, and
a stop element (18) protruding into this groove, which is arranged on a component of the same control head bearing firmly connected to the head tube (1), and is located in the center of the circular arc-shaped groove of the component firmly connected to the fork when the handlebar stem set in a straight position,
the method comprising:
inserting the circular groove into a base (4) of the lower control head bearing as a circular arc-shaped recess (15) that is open towards an inner sheath of a lower bearing shell (6);
inserting a recess (17) extending across a height of the lower bearing shell (6) into the lower bearing shell (6);
wherein the stop element (18) comprises at least two different radial thicknesses across its height, wherein the thickness in a region of the lower rolling bearing (5) is not greater than a radial depth of the open recess (17) of the lower bearing shell (6) and the thickness in a region of the base (4) is dimensioned in such a way that the stop element (18) protrudes into the circular arc-shaped groove of the base (4), and
moving the stop element (18) radially into the position above the open recess (17) of the lower bearing shell (6) and pressing the stop element (18) together with the lower rolling bearing (5) into the lower bearing shell (6).

7. A headset arranged within a head tube (1) of a two- or three-wheeled vehicle, comprising:
an upper headset bearing with an upper rolling bearing (2); and
a lower headset bearing, comprising
a base (4) connected in a torque-proof manner to a fork of the vehicle,
a lower rolling bearing (5) arranged above the base (4),
a lower bearing shell (6) connected in a torque-proof manner to the head tube (1), the base (4) and the lower rolling bearing (5) being coaxially received in the lower bearing shell (6),
a circular arc-shaped recess (15) arranged in the base (4), the circular arc-shaped recess (15) being radially open towards an inner sheath of the lower bearing shell (6),
a cavity (17) in the lower bearing shell (6) that is open towards the lower rolling bearing (5) and extends across a height of the lower bearing shell (6);
a stop element (18) received in the cavity (17),
wherein the stop element (18) comprises at least two different radial thicknesses across its height,
wherein a first of the at least two different radial thicknesses in a region of the lower rolling bearing (5) is not greater than a radial depth of the cavity (17) of the lower bearing shell (6), and
wherein a second of the at least two different radial thicknesses in a region of the base (4) is dimensioned in such a way that the stop element (18) protrudes radially inwardly beyond the cavity (17) into the circular arc-shaped recess (15) of the base (4).

\* \* \* \* \*